United States Patent [19]

Snodie

[11] 4,021,958
[45] May 10, 1977

[54] ICE FISHING TIP-UP
[76] Inventor: William R. Snodie, 357 Bradley Ave., Delavan, Wis. 53115
[22] Filed: Oct. 6, 1975
[21] Appl. No.: 619,943
[52] U.S. Cl. .................................................. 43/17
[51] Int. Cl.² ......................................... A01K 97/12
[58] Field of Search ................................... 43/17, 16

[56] References Cited
UNITED STATES PATENTS

| | | | |
|---|---|---|---|
| 2,506,092 | 5/1950 | Lyons | 43/17 |
| 2,636,303 | 4/1953 | Feigley et al. | 43/17 |
| 2,654,176 | 10/1953 | Kachelski et al. | 43/17 |
| 3,352,048 | 11/1967 | Fleming | 43/17 |
| 3,641,693 | 2/1972 | Pinnow | 43/17 |

Primary Examiner—Warner H. Camp
Attorney, Agent, or Firm—Andrus, Sceales, Starke & Sawall

[57] ABSTRACT

The ice fishing tip-up comprises a base member and a strut pivoted to the base member. The strut carries a rotatable shaft having the fish line spool fixed axially on the lower end thereof beneath the base member. A latch lever projects radially from the upper end of the shaft above the base member and is frictionally engageable in the fishing mode with a signal mast flexibly mounted on the base. The spool along with the shaft and latch lever is rotatable as when a fish strikes to release the signal mast which is biased to an upright position to indicate the strike. The latch lever is made of a flexible material such as light weight metal which will readily bend in response to finger manipulation to any desired bent posture so that the frictional hold of the latch lever on the signal mast can be varied to suit different types and sizes of live bait such as minnows secured to the fish hook at the lower end of the line. The spool shaft is mounted on the leading side of the pivotal strut so that when the strut is pivoted to a folded condition the underside of the base member is generally unobstructed to provide for convenient handling and storage.

2 Claims, 6 Drawing Figures

ICE FISHING TIP-UP

NATURE AND SUMMARY OF THE INVENTION

This invention relates to an ice fishing tip-up.

Ice fishing tip-ups can variously be faulted for being elaborate and costly, difficult to handle and store, and difficult to place in the fishing mode especially when wearing cold weather gear. These faults do not pertain to the tip-up of this invention.

Broadly according to this invention, the ice fishing tip-up includes a base member adapted to span an ice fishing hole. The tip-up further includes a shaft and means for rotatably supporting the shaft generally normal to the base member. The shaft projects downwardly beneath the base member for submergence of the lower end portion in the water and upwardly above the base member. A spool of fishing line to which a fish hook is attached is mounted axially and fixedly on the submerged lower end portion of the shaft. Lever means including a latch projection is fixed to the upper end of the shaft and projects radially from the shaft. The lever means can be utilized to rotate the spool, and in turn, can be rotated by the spool. A signal mast is flexibly secured to the base member in spaced relation from the shaft, and means are provided to bias the signal mast to a generally upright position.

In operation, the signal mast is bent against the pressure of the biasing means for frictional engagement under the latch projection of the shaft. Upon rotation of the spool and shaft, as in response to the strike by a fish, the latch projection is rotated to release the signal means and thereby indicate the strike.

According to further aspects of the invention, the spool shaft is carried by a pivotal strut. The strut along with the shaft are pivoted relative to the base member to a folded condition to provide for convenient handling and storage. The latch projection is made of a flexible material which will readily bend in response to finger manipulation and retain any desired bent posture. Thus, the frictional hold of the latch lever on the signal mast can be varied to suit different types and sizes of live bait desired to be used.

DESCRIPTION OF THE DRAWING FIGURES

The drawings furnished herewith illustrate the best mode presently contemplated and are described hereinafter.

DESCRIPTION OF THE ILLUSTRATED EMBODIMENT

Figure 1:
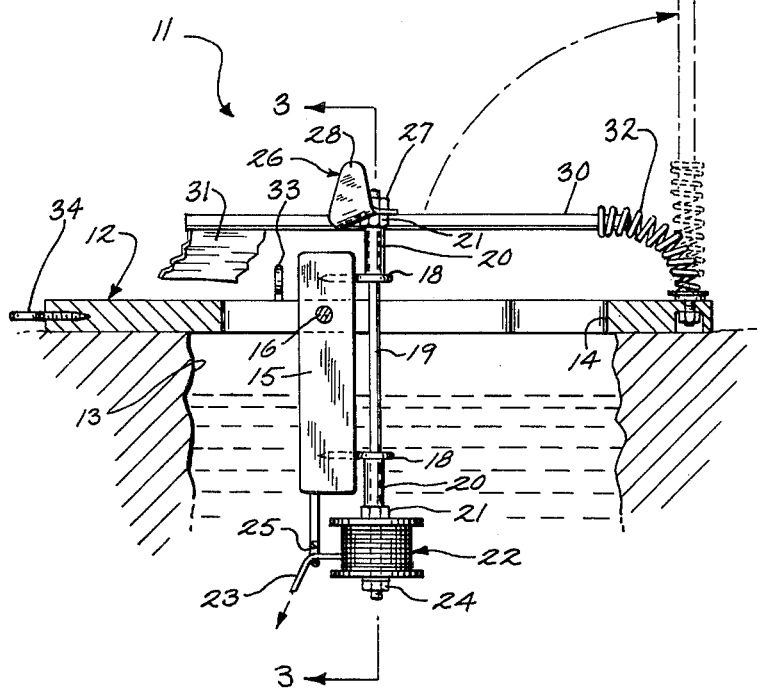
FIG. 1 is a side elevation with parts broken away and sectioned of the ice fishing tip-up of this invention and shows the signal staff in solid lines in normal fishing position and in dotted lines in the strike indicating position.
Figure 2:
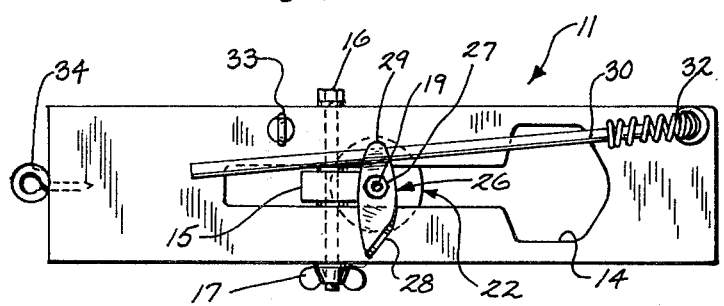
FIG. 2 is a plan view of the ice fishing tip-up.

Referring to the drawings, the fishing tip-up comprises a generally rectangular base member 12 having a length adequate to span the usual hole 13 as provided through the ice for fishing. The base member 12 may be fabricated of wood, plastic or other suitable light weight material and is provided with a spoonshaped opening 14 intermediate its length and generally along its longitudinal center line.

A strut member 15 is disposed in the narrow portion of opening 14 and is pivotally supported from the base member 12 by a suitable transverse pin member or bolt 16. The strut 15 is at least pivotal between a fishing position wherein the strut is disposed vertically, generally normal to the base member 12 as shown in FIG. 1 and the folded position of FIG. 6. A frictional force is imposed on the pivotal movement of the strut 15 so that the strut will generally remain in the position to which it is manually moved. The frictional force may be varied by the wing nut 17 threaded onto the end of the pin member or bolt 16.

Figure 6:
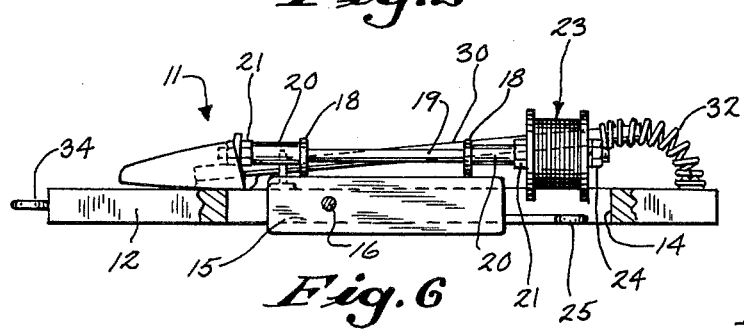
FIG. 6 is a side elevation with parts broken away and sectioned and shows the ice fishing tip-up in a folded and non-use condition.

The trailing side of the strut member 15 as the latter is moved from the folded position of FIG. 6 to the fishing position of FIG. 1, is provided with a pair of spaced and axially aligned bearing members 18 for rotatably supporting the spool shaft 19 in spaced, generally parallel relation relative to the strut. Annular spacer members 20 are disposed on the shaft 19 outwardly of the respective bearing members 18 and extend from the bearings outwardly beyond the corresponding ends of the strut 15. The respective spacer members 20 are confined outwardly by the nuts 21 threaded onto the opposed ends of shaft 19. The nuts 21 further serve to generally confine the shaft 19 against movement axially.

In the posture of shaft 19 in FIG. 1, a spool 22 of fishing line 23 is axially mounted on the lower end of the shaft between the nut 21 and the lower end nut 24. The spool 22 is fixed relative to the shaft 19 and rotates therewith, and the fishing line 23 is played tangentially from the spool through the eye 25 which projects downwardly from the corresponding end of the strut 15 in spaced relation from the spool. As generally shown in FIG. 1, the spool 22 and its fishing line 23 will be submerged in the water and thus remain unaffected by any water surface freeze-up.

The upper end of the shaft 19 opposite from spool 22 carries a lever plate 26 fixed intermediate its length relative to the shaft between the corresponding nut 21 and the upper end nut 27. One end of the lever plate 26 includes a generally upright portion 28 spaced radially from the shaft 19 to provide for better finger manipulation of the lever. The end of lever plate 26 on the opposite side of shaft 19 from finger manipulation portion 28 comprises a latch lever 29 for engaging with the signal mast 30.

The mast 30 may carry a more readily observable signal flag 31 at the upper end thereof and is mounted at one corner of the base member 12 by means of a flexible coil spring 32. In the fishing posture of the tip-up 11, the signal mast 30 is bent over frictionally engaged under the latch lever 29. The frictional engagement between the mast 30 and the latch lever 29 retains the shaft 19 and spool 22 against rotation so that the hook and bait, not shown, on the end of fishing line 23 can be played at a desired depth in anticipation of a strike.

Figure 4:
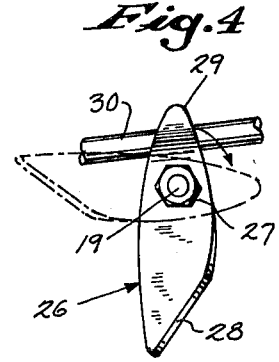
FIG. 4 is a detail view showing the trigger member in fishing position holding the signal staff and in dotted lines as rotated in response to a strike to release the signal staff.

When a fish does strike, its natural impulse to run effects an unwinding of the line 23 from the spool 22 whereby the shaft 19 and latch lever 29 are rotated to release the signal mast 30 as generally shown in FIG. 4. Under the influence of the stored energy in the spring 32, the released mast 30 will swing wildly toward the upright position as generally indicated by the dotted line position of the mast in FIG. 1. To reset the tip-up 11, the spent or played out line 23 is rewound onto the spool 22 by turning the lever plate 26 until the hook and bait are returned to the desired depth and the mast 30 is again frictionally engaged under the latch lever 29.

Figure 3:
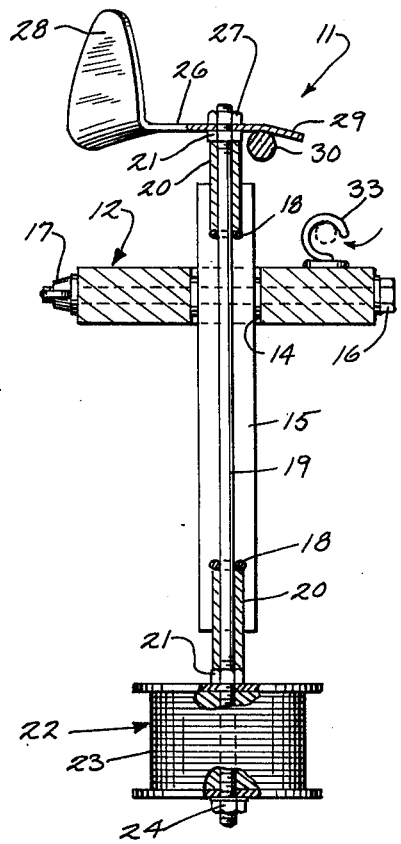
FIG. 3 is an enlarged sectional view of the fishing tip-up taken generally on line 3—3 of FIG. 1.
Figure 5:
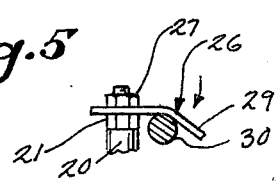
FIG. 5 is a detail view and shows how the trigger member can be bent so as to impose a greater drag upon the spool.

At least the latch lever portion 29 of the lever plate 26 is fabricated from a flexible material which will readily bend in response to finger manipulation and retain any desired bent posture. In FIG. 5, the latch lever 29 is shown to have a substantial bend whereby to correspondingly increase the frictional hold on the signal mast 30. For the bent posture of latch lever 29 as illustrated in FIG. 5, a more substantial pull on the line 23 will be necessary to trip or effect release of the signal mast 30 than would be required for the bent posture of the latch lever as shown in FIG. 3. The tip-up 11 is thus "adjustable" to provide for different types and sizes of live bait which is secured to the hook at the lower end of line 23.

The pivotal connection for the strut 15 together with the spoon-shaped opening 14 in the base member 12 provide for the convenient folding of the tip-up 11. The strut 15 is pivoted into the opening 14 for disposition longitudinally in the narrow portion of the opening with the center lines of the strut and base members generally coinciding. As the strut 15 is pivoted into the folded condition, the spool 22 passes through the enlarged portion of opening 14 and comes to rest generally on the upper side of the base member 12. In the folded condition, the signal mast 30 is secured under the hook 33 which projects upwardly from the base member 12 near the same side edge adjacent to which the spring 32 is secured. The tip-up 11 has a nearly flat unobstructed underside in the folded condition for handling and storage ease. An eye hook 34 can be provided at one end of the base member 12 for hanging storage as shown.

Various modes of carrying out the invention are contemplated as being within the scope of the following claims particularly pointing out and distinctly claiming the subject matter which is regarded as the invention.

I claim:

1. In an ice fishing tip-up, a base member adapted to span an ice fishing hole, a shaft, means for rotatably supporting the shaft generally normal to the base member, said shaft projecting downwardly beneath the base member for submergence of the lower end portion thereof in the water and extending upwardly above the base member, a spool for fishing line mounted axially and fixedly on the submersible lower end portion of the shaft, lever means including a latch portion of flexible light weight metal having a plate-like shape and fixed to the upper end of the shaft and projecting radially therefrom whereby to rotate the spool and be rotated by the spool, a signal mast flexibly secured to the base member in spaced relation from the shaft, and means biasing the signal mast to an upright position, said signal mast being swingable against the pressure of the biasing means for frictional engagement under the latch portion on the shaft, said spool being rotatable with the shaft as in response to a fish strike to rotate the latch portion and release the signal means to indicate the strike, and said latch portion being subject to bending to a desired position partially encircling the signal mast by finger manipulation and capable of retaining such position whereby the frictional hold on the signal mast is varied in accordance with the size and type of live bait used on the hook at the submerged end of the fishing line.

2. The structure as set forth in claim 1 wherein the lever means and latch portion thereon are of light weight metal, and an upright projection on the lever means opposite the latch portion to signal a fish strike upon rotation by action of a fish and in addition providing finger holding means to hold the latch when it is being bent to the desired position and also to rotate the lever to a position over the signal mast.

* * * * *